Nov. 20, 1945.  A. McLENNAN  2,389,381

REVERSIBLE SINGLE-PHASE MOTOR

Filed April 23, 1943

WITNESSES

INVENTOR
Alexander McLennan.
BY
ATTORNEY

Patented Nov. 20, 1945

2,389,381

UNITED STATES PATENT OFFICE 2,389,381

REVERSIBLE SINGLE-PHASE MOTOR

Alexander McLennan, Norwood, Ohio, assignor to Westinghouse Electric Corporation, East Pittsburgh, Pa., a corporation of Pennsylvania Application April 23, 1943, Serial No. 484,133

13 Claims. (Cl. 172—279)

The present invention relates to single-phase induction motors, and more particularly to a reversible single-phase motor of simple and inexpensive construction.

Single-phase induction motors usually have a main or running primary winding and an auxiliary or starting primary winding, which are physically displaced from each other on the stator of the motor and which carry currents which are displaced in phase, the phase displacement between the currents being produced usually by means of a capacitor connected in series with the auxiliary winding, as in the capacitor-start motor, or by the design of the windings, as in the split-phase motor. In starting the motor, both the main and auxiliary windings are connected in parallel to the supply line, and when the motor has accelerated to a high enough speed, usually about 80% of the rated speed, the auxiliary winding is disconnected from the line by means of a speed-responsive switch.

Motors of this type can be reversed merely by reversing the connections of the main and auxiliary windings with respect to each other, but the conventional motor, as just described, cannot be plugged, or reversed while running, since the auxiliary winding is disconnected from the line by the starting switch and reversal of the connections has no effect. In order to reverse single-phase motors while running, therefore, it has been necessary to use relatively complicated control systems, usually involving external relays for reconnecting the auxiliary winding to the line while the starting switch is open. These plug reversing schemes are relatively complicated and expensive, and the cost of such control schemes has greatly limited the use of capacitor-start and split-phase motors for applications where plug reversing is required.

The principal object of the present invention is to provide a single-phase induction motor which can be plugged, or reversed while running, and which is of simple and inexpensive construction.

A further object of the invention is to provide a reversible single-phase motor which can be reversed while running and which requires only very simple and inexpensive external control equipment.

A more specific object of the invention is to provide a reversible single-phase motor using two speed-responsive switches of relatively inexpensive construction with means, such as oneway clutches, for actuating them so that one switch is actuated only when the motor is running in one direction, and the other switch is actuated only when the motor is running in the opposite direction, so that when the connection of the auxiliary winding is reversed by the external control to effect reversal of the motor, the non-actuated switch permits the auxiliary winding to be connected to the line to effect immediate reversal of the motor without requiring any external relay or expensive control equipment.

The invention will be more fully understood from the following detailed description, taken in connection with the accompanying drawing, in which.

Figure 1:
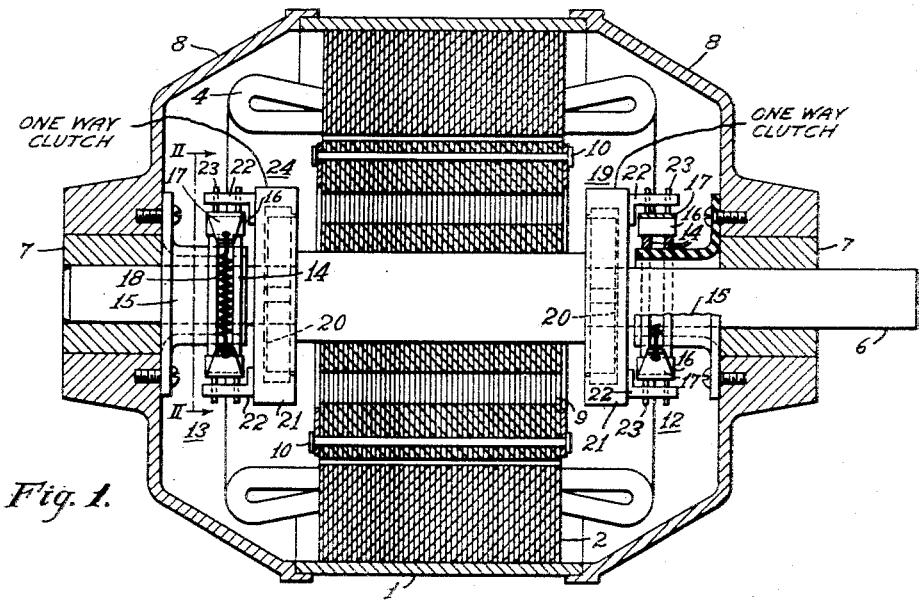
Figure 1 is a longitudinal sectional view of a motor embodying the invention.

The invention is shown in the drawing as embodied in a single-phase capacitor-start motor of more or less standard construction, having a frame 1 in which is supported a laminated stator core 2. The motor has a main primary winding 3 and an auxiliary primary winding 4 which are placed in slots in the inner periphery of the stator core 2 in the usual manner. As shown diagrammatically in Fig. 3, the windings 3 and 4 are displaced from each other on the stator core, preferably by ninety electrical degrees, and one end of the auxiliary winding 4 is connected to the mid-point of the main winding 3, as indicated at 5. The motor also has a shaft 6 which is supported in suitable bearings 7 in end brackets 8 secured to the frame 1. A laminated rotor core 9 is secured to the shaft 6 and a suitable secondary winding, shown as a squirrel-cage winding 10, is carried on the rotor core 9.

As indicated above, one end of the auxiliary winding 4 is connected to the mid-point of the main winding 3. A capacitor 11 is connected in series with the other end of the auxiliary winding 4 to produce the required phase displacement between the currents in the two primary windings, and this end of the auxiliary winding 4 is adapted to be connected to either one side or the other of a single-phase supply line through one or the other of two speed-responsive switches 12 and 13. It will be seen that in this way the connection of the auxiliary winding 4 can readily be reversed with respect to the main winding 3. The invention has been illustrated as applied to a capacitor-start motor, but it will be apparent that it is equally applicable to other types of single-phase motors, such as the split-phase motor in which the phase displacement between the currents in the primary windings is produced by the design of the windings themselves.

Figures 2, 3:
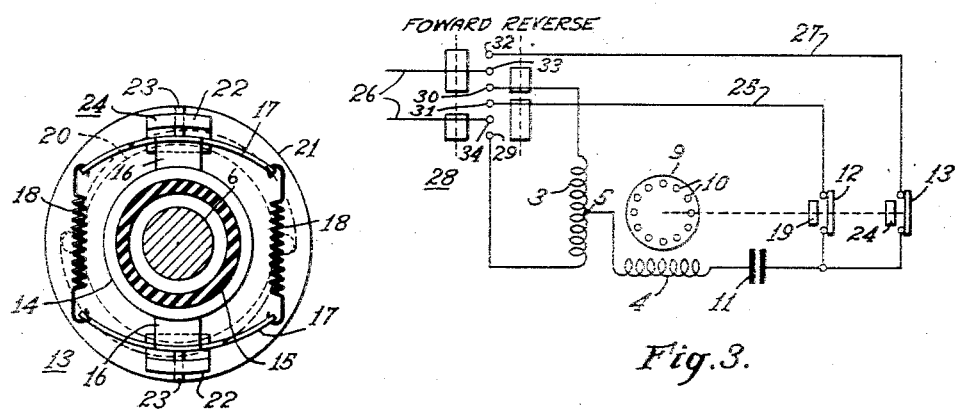
Fig. 2 is an end view, partly in section, of one of the speed-responsive switches, approximately on the line II—II of Fig. 1.
Fig. 3 is a schematic wiring diagram illustrating the electrical connections of the motor and control.

The speed-responsive switches 12 and 13 and their driving means are shown in Figs. 1 and 2. Both switches are identical in construction. Each of the speed-responsive switches comprises two stationary slip rings 14, which are insulated from each other and mounted on the end bracket 8 of the motor in any suitable manner, as by means of a sleeve 15 of insulating material which encircles the shaft 6 and is secured to the end bracket. The switch has a pair of bridging members 16 which may be carbon brushes of suitable size to bridge the two rings 14 and to extend over a substantial length of their circumference. The two bridging members 16 are placed in opposed position, as clearly seen in Fig. 2, and each member 16 has a spring support 17 attached to it. The spring supports 17 are preferably relatively rigid members and extend transversely of the shaft and beyond the peripheries of the rings 14. The spring supports 17 of the two bridging members 16 are connected by helical tension springs 18 placed on opposite sides of the shaft to draw the bridging members into engagement with the rings 14.

The switch 12 is driven from the shaft 6 by means of a clutch 19, which has an inner or driving member 20 secured to the shaft, and an outer or driven member 21. The clutch 19 is a one-way clutch, of any suitable type, which is so designed that the driving member 20 drives the driven member 21 when the shaft 6 is rotating in one direction, but does not drive the driven member 21 when the shaft is rotating in the opposite direction. The driven member 21 of the clutch 19 carries a pair of opposed projections or lugs 22, and the bridging members 16 of the switch 12 are driven by these lugs by means of pins 23 which extend outwardly from the bridging members 16 and pass through holes in the lugs 22. One of the rings 14 of the switch is connected to the auxiliary winding 4 in series with the capacitor 11, while the other ring 14 is connected to the external circuit. The springs 18 normally hold the bridging members 16 in engagement with the rings 14 to bridge the rings and close the circuit when the switch is stationary. When the shaft 6 rotates in the proper direction to drive the driven member 21 of the clutch 19, the lugs 22 drive the bridging members 16 around the rings 14 until the motor reaches a speed at which the centrifugal force acting on the bridging members 16 overcomes the restraining force of the springs 18, and the bridging members 16 then move radially outward away from the rings 14 to open the circuit, the radial motion being guided by the pins 23 and limited by the lugs 22. Thus, a speed-responsive switch of simple and inexpensive construction is provided. The switch 13 is identical with the switch 12 and is driven by a one-way clutch 24 which is the same as the clutch 19, except that it is designed to drive the switch 13 only when the shaft is rotating in the opposite direction from the direction which causes the clutch 19 to drive its switch 12. The switches 12 and 13 are preferably mounted on opposite ends of the motor, but it will be obvious that both switches might be mounted at the same end, if desired, although a larger end bracket would then be necessary at that end.

The electrical connections of the motor are shown in Fig. 3. As previously described, one end of the auxiliary winding 4 is connected through the capacitor 11 to both the speed-responsive switches 12 and 13. The speed-responsive switch 12 is adapted to be connected through a conductor 25 to one side of a single-phase supply line 26, while the speed-responsive switch 13 is adapted to be connected through a conductor 27 to the other side of the line 26. The connection of one or the other of the conductors 25 and 27 to the supply line may be made by any suitable type of external control equipment and a simple drum-type controller 28 is shown in the drawing for the purpose of illustration. The terminals of the main winding 3 are connected to fixed contacts 29 and 30 of the controller and the conductors 25 and 27 are connected to fixed contacts 31 and 32, respectively. The single-phase supply line 26 is connected to the fixed contacts 33 and 34.

The operation of the motor should now be apparent. If the motor is at standstill and it is desired to start it in either direction, the drum controller 28 is moved to either its forward or reverse position. Assuming that the controller is moved to its forward position, it will be seen that the fixed contacts 29 and 34 are bridged, and the contacts 30, 32 and 33 are bridged, so that the main winding 3 is connected across the line, and the auxiliary winding 4 is connected to the line through the speed-responsive switch 13 and the conductor 27. Since both switches are closed when the motor is at standstill, the circuit of the auxiliary winding 4 is complete and the motor will start to run in the forward direction. When the motor has accelerated to a predetermined speed, the switch 13 interrupts the circuit and disconnects the winding 4 from the line, and the motor continues to run on the main winding 3 alone. The speed-responsive switch 12 remains closed at this time since its one-way clutch 19 does not drive it when the shaft is rotating in the forward direction.

If it is now desired to plug the motor, or to reverse it while it is running, it is only necessary to move the controller 28 to the reverse position. In this position the contacts 30 and 33 are bridged and the contacts 29, 31 and 34 are bridged. Thus, the main winding 3 is again connected across the line in the same direction as before, but the auxiliary winding 4 is connected through the speed-responsive switch 12 and the conductor 25 to the other side of the line so that its connection with respect to the main winding is reversed. Since the switch 12 is still closed, the connection of the auxiliary winding to the line is completed as soon as the controller is moved to the reverse position, and the motor immediately plugs to a stop and reverses. As soon as the motor has accelerated to the predetermined speed in the reverse direction, the switch 12 opens and disconnects the auxiliary winding from the line. As soon as the motor has reversed its direction of rotation, the one-way clutch 24 ceases to drive the switch 13 so that it remains closed and a circuit is prepared for further reversal of the motor as soon as the controller is again moved to the forward position. Thus, when the motor is running in either direction, the switch which is driven only in the opposite direction remains closed, and a circuit is prepared for immediate reversal of the motor as soon as the external control is actuated.

It will be apparent, therefore, that a very simple and inexpensive arrangement has been provided for plug reversing a single-phase motor. The present invention provides a reversing means which requires no external relay or complicated control equipment, and which involves the use only of two relatively simple and inexpensive speed-responsive switches and one-way clutches or equivalent devices, in the motor itself. It is to be understood, of course, that any suitable type of external control may be used to effect the connection of the main winding and one or the other of the conductors 25 and 27 to the supply line. Thus, instead of the drum controller 28, which has been shown only for the purpose of illustration, any other suitable switching means may be used, such as manually operated switches, or magnetically operated contactors which may be actuated either manually or automatically by limit switches or other means. Thus, the present invention provides a means for reversing single-phase motors which is very flexible in application as well as simple and inexpensive. The particular type of speed-responsive switch shown and described is desirable because of its simplicity and cheapness, but any other suitable type of switch with equivalent driving means could obviously be used.

It is to be understood that although a specific embodiment of the invention has been shown and described for the purpose of illustration, the invention is not limited to the particular arrangement shown, but is capable of various modifications and embodiments, and in its broadest aspects it includes all equivalent embodiments and modifications which come within the scope of the appended claims.

I claim as my invention:

1. A reversible, single-phase induction motor comprising a stator member, a main primary winding and an auxiliary primary winding on said stator member, a rotor member, a secondary winding on said rotor member, means for connecting said primary windings to a single-phase supply line, said connecting means including means for reversing the connection of one of said primary windings with respect to the other to effect reversal of the direction of rotation of the motor, a pair of independently operable speed-responsive switches, each of said switches being normally closed and being adapted to move to open position when actuated at a predetermined speed of the motor, means for connecting one of said switches in series with said auxiliary winding when the primary windings are connected for one direction of rotation and for connecting the other of said switches in series with the auxiliary winding when the primary windings are connected for the opposite direction of rotation, means for actuating one of said switches only when the motor is running in one direction, and means for actuating the other of said switches only when the motor is running in the opposite direction.

2. A reversible, single-phase induction motor comprising a stator member, a main primary winding and an auxiliary primary winding on said stator member, a rotor member, a secondary winding on said rotor member, means for connecting said primary windings to a single-phase supply line, said connecting means including means for reversing the connection of one of said primary windings with respect to the other to effect reversal of the direction of rotation of the motor, a pair of independently operable speed-responsive switches, each of said switches being normally closed and being adapted to move to open position when actuated at a predetermined speed of the motor, means for connecting a first one of said switches in series with said auxiliary winding when the primary windings are connected for rotation of the motor in the forward direction and for connecting the second of said switches in series with the auxiliary winding when the primary windings are connected for rotation of the motor in the reverse direction, means for actuating said first switch only when the motor is running in the forward direction, and means for actuating said second switch only when the motor is running in the reverse direction.

3. A reversible, single-phase induction motor comprising a stator member, a main primary winding and an auxiliary primary winding on said stator member, a rotor member, a secondary winding on said rotor member, a pair of independently operable speed-responsive switches, each of said switches being normally closed and being adapted to move to open position when actuated at a predetermined speed of the motor, means for connecting said primary windings to a single-phase supply line, said connecting means including switching means for effecting connection of said primary windings to cause rotation of the motor in one direction and to connect one of said speed-responsive switches in series with said auxiliary winding, and said switching means being alternatively operable to effect connection of said primary windings to cause rotation of the motor in the opposite direction and to connect the other of said speed-responsive switches in series with said auxiliary winding, means for actuating one of said speed-responsive switches only when the motor is running in one direction, and means for actuating the other of said speed-responsive switches only when the motor is running in the opposite direction.

4. A reevrsible, single-phase induction motor comprising a stator member, a main primary winding and an auxiliary primary winding on said stator member, a rotor member, a secondary winding on said rotor member, a pair of independently operable speed-responsive switches, each of said switches being normally closed and being adapted to move to open position when actuated at a predetermined speed of the motor, means for connecting said primary windings to a single-phase supply line, said connecting means including switching means for effecting connection of said primary windings to cause rotation of the motor in the forward direction and to connect a first one of said speed-responsive switches in series with said auxiliary windings, and said switching means being alternatively operable to effect connection of said primary windings to cause rotation of the motor in the reverse direction and to connect the second of said speed-responsive switches in series with said auxiliary winding, means for actuating said first speed-responsive switch only when the motor is running in the forward direction, and means for actuating said second speed responsive switch only when the motor is running in the reverse direction.

5. A reversible, single-phase induction motor comprising a stator member, a main primary winding and an auxiliary primary winding on said stator member, a rotor member, a secondary winding on said rotor member, means for connecting said primary windings to a single-phase supply line, said connecting means including switching means for effecting reversal of the connection of said auxiliary winding with respect to the main winding to cause the motor to reverse its direction of rotation, a pair of independently operable speed-responsive switches, each of said speed-responsive switches being normally closed and being adapted to move to open position when it is actuated at a predetermined speed of the motor, said switching means being operative alternatively to connect a first one of said speed-responsive switches between one end of said auxiliary winding and one side of said supply line or to connect the second of said speed-responsive switches between said end of the auxiliary winding and the other side of the supply line, means driven by the motor for actuating said first speed-responsive switch only when the motor is running in one direction, and means for actuating said second speed-responsive switch only when the motor is running in the other direction.

6. A reversible, single-phase induction motor comprising a stator member, a main primary winding and an auxiliary primary winding on said stator member, a rotor member, a secondary winding on said rotor member, means for connecting said primary windings to a single-phase supply line, said connecting means including switching means for effecting reversal of the connection of said auxiliary winding with respect to the main winding to cause the motor to reverse its direction of rotation, a pair of independently operable speed-responsive switches, each of said speed-responsive switches being normally closed and being adapted to move to open position when it is actuated at a predetermined speed of the motor, said switching means being operative alternatively to connect a first one of said speed-responsive switches between one end of said auxiliary winding and one side of said supply line to cause rotation of the motor in the forward direction or to connect the second of said speed-responsive switches between said end of the auxiliary winding and the other side of the supply line to cause rotation of the motor in the reverse direction, means driven by the motor for actuating said first speed-responsive switch only when the motor is running in the forward direction, and means for actuating said second speed-responsive switch only when the motor is running in the reverse direction.

7. A reversible, single-phase induction motor comprising a stator member, a main primary winding and an auxiliary primary winding on said stator member, a rotor member, a secondary winding on said rotor member, means for connecting said primary windings to a single-phase supply line, said connecting means including switching means for effecting reversal of the connection of said auxiliary winding with respect to the main winding to cause the motor to reverse its direction of rotation, a pair of independently operable speed-responsive switches, each of said speed-responsive switches being normally closed and being adapted to move to open position when it is actuated at a predetermined speed of the motor, said switching means being alternatively operable to connect a first one of said speed-responsive switches between one end of said auxiliary winding and one side of said supply line to cause rotation of the motor in the forward direction or to connect the second of said speed-responsive switches between said end of the auxiliary winding and the other side of the supply line to cause rotation of the motor in the reverse direction, first clutch means driven by the motor for actuating said first speed-responsive switch, said first clutch means being operative only when the motor is running in the forward direction, and second clutch means driven by the motor for actuating said second speed-responsive switch, said second clutch means being operative only when the motor is running in the reverse direction.

8. A reversible, single-phase induction motor comprising a stator member, a main primary winding and an auxiliary primary winding on the stator member, said primary windings being physically displaced from each other and being adapted to carry currents which are displaced in phase, a rotor member, a secondary winding on the rotor member, means for connecting said main primary winding to a single-phase supply line, one end of said auxiliary winding being connected to the mid-point of the main winding, means for alternatively connecting the other end of the auxiliary winding to one side or the other of the supply line to cause the motor to rotate in one direction or the other, two independently operable speed-responsive switches, each of said switches being normally closed and being adapted to move to open position when actuated at a predetermined speed of the motor, means connecting one of said speed-responsive switches in series with the auxiliary winding when it is connected to one side of the supply line, means connecting the other of said speed-responsive switches in series with the auxiliary winding when it is connected to the other side of the supply line, means for actuating one of said switches only when the motor is running in one direction, and means for actuating the other of said switches only when the motor is running in the other direction.

9. A reversible, single-phase induction motor comprising a stator member, a main primary winding and an auxiliary primary winding on the stator member, said primary windings being physically displaced from each other and being adapted to carry currents which are displaced in phase, a rotor member, a secondary winding on the rotor member, means for connecting said main primary winding to a single-phase supply line, one end of said auxiliary winding being connected to the mid-point of the main winding, means for alternatively connecting the other end of the auxiliary winding to one side or the other of the supply line to cause the motor to rotate in one direction or the other, two independently operable speed-responsive switches, each of said switches being normally closed and being adapted to move to open position when actuated at a predetermined speed of the motor, means connecting a first one of said speed-responsive switches in series with the auxiliary winding when it is connected to one side of the supply line to cause rotation of the motor in the forward direction, means connecting the second one of said speed-responsive switches in series with the auxiliary winding when it is connected to the other side of the supply line to cause rotation of the motor in the reverse direction, means for actuating said first switch only when the motor is rotating in the forward direction, and means for actuating said second switch only when the motor is rotating in the reverse direction.

10. A reversible, single-phase induction motor comprising a stator member, a main primary winding and an auxiliary primary winding on the stator member, said primary windings being physically displaced from each other and being adapted to carry currents which are displaced in phase, a rotor member, a secondary winding on the rotor member, means for connecting said main primary winding to a single-phase supply line, one end of said auxiliary winding being connected to the mid-point of the main winding, a pair of independently operable speed-responsive switches, each of said switches being normally closed and being adapted to move to open position when actuated at a predetermined speed of the motor, means for alternatively connecting a first one of said switches in series between the other end of the auxiliary winding and one side of the supply line to cause rotation of the motor in the forward direction or for connecting the second one of said switches in series between said other end of the auxiliary winding and the other side of the supply line to cause rotation of the motor in the reverse direction, means for actuating said first speed-responsive switch only when the motor is running in the forward direction, and means for actuating said second speed-responsive switch only when the motor is running in the reverse direction.

11. A reversible, single-phase induction motor comprising a stator member, a main primary winding and an auxiliary primary winding on the stator member, said primary windings being physically displaced from each other and being adapted to carry currents which are displaced in phase, a rotor member, a secondary winding on the rotor member, means for connecting said main primary winding to a single-phase supply line, one end of said auxiliary winding being connected to the mid-point of the main winding, a pair of independently operable speed-responsive switches, each of said switches being normally closed and being adapted to move to open position when actuated at a predetermined speed of the motor, means or alternatively connecting a first one of said switches in series between the other end of the auxiliary winding and one side of the supply line to cause rotation of the motor in the forward direction or for connecting the second one of said switches in series between said other end of the auxiliary winding and the other side of the supply line to cause rotation of the motor in the reverse direction, clutch means driven by the motor for actuating said first speed-responsive switch, said clutch means being operative only when the motor is running in the forward direction, and other clutch means driven by the motor for actuating said second speed-responsive switch, said last-mentioned clutch means being operative only when the motor is running in the reverse direction.

12. A reversible, single-phase induction motor comprising a stator member, a main primary winding and an auxiliary primary winding on the stator member, said primary windings being physically displaced from each other and being adapted to carry currents which are displaced in phase, a rotor member, a secondary winding on the rotor member, means or connecting said main primary winding to a single-phase supply line, one end of said auxiliary winding being connected to the mid-point of the main winding, a pair of independently operable speed-responsive switching devices actuated by the motor, means for alternatively connecting a first one of said switching devices in series between the other end of the auxiliary winding and one side of the supply line to cause rotation of the motor in the forward direction or for connecting the second of said switching devices in series between said other end of the auxiliary winding and the other side of the supply line to cause rotation of the motor in the reverse direction, each of said switching devices comprising two stationary rings mounted on the motor and insulated from each other, a pair of opposed conducting bridging members riding on said rings and adapted to rotate thereon, resilient means urging said bridging members into engagement with the rings, said bridging members being otherwise free to move radially outward away from the rings under the influence of centrifugal force, and clutch means driven by the motor for driving said bridging members, the clutch means of said first switching device being operative only when the motor is running in the forward direction, and the clutch means of said second switching device being operative only when the motor is running in the reverse direction.

13. A reversible, single-phase induction motor comprising a stator member, a main primary winding and an auxiliary primary winding on said stator member, a rotor member, a secondary winding on said rotor member, means for connecting said primary windings to a single-phase supply line, said connecting means including means for reversing the connection of one of said primary windings with respect to the other to effect reversal of the direction of rotation of the motor, a pair of independently operable speed-responsive switches, means for connecting a first one of said switches in series with said auxiliary winding when the primary windings are connected for rotation of the motor in the forward direction and for connecting the second of said switches in series with the auxiliary winding when the primary windings are connected for rotation of the motor in the reverse direction, each of said switches comprising two stationary rings mounted on the motor and insulated from each other, a pair of opposed conducting bridging members riding on said rings and adapted to rotate thereon, resilient means urging said bridging members into engagement with the rings, said bridging members being otherwise free to move radially outward away from the rings under the influence of centrifugal force, and clutch means driven by the motor for driving said bridging members, the clutch means of said first switching device being operative only when the motor is running in the forward direction, and the clutch means of said second switching device being operative only when the motor is running in the reverse direction.

ALEXANDER McLENNAN.